US011511472B2

United States Patent
Quan et al.

(10) Patent No.: US 11,511,472 B2
(45) Date of Patent: Nov. 29, 2022

(54) METHOD FOR THE PREPARATION OF BIOFILM CARRIER WITH BIOCHAR FIXED BY THERMOPLASTIC RESIN

(71) Applicant: DALIAN UNIVERSITY OF TECHNOLOGY, Liaoning (CN)

(72) Inventors: Xie Quan, Liaoning (CN); Yanjun Mao, Liaoning (CN); Shuo Chen, Liaoning (CN); Hongtao Yu, Liaoning (CN); Yaobin Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 397 days.

(21) Appl. No.: 16/761,315

(22) PCT Filed: Nov. 17, 2017

(86) PCT No.: PCT/CN2017/111713
§ 371 (c)(1),
(2) Date: May 4, 2020

(87) PCT Pub. No.: WO2019/095306
PCT Pub. Date: May 23, 2019

(65) Prior Publication Data
US 2021/0129408 A1 May 6, 2021

(51) Int. Cl.
| | | |
|---|---|---|
| *B29C 48/08* | (2019.01) | |
| *B29C 48/92* | (2019.01) | |
| *B29C 48/00* | (2019.01) | |
| *B29B 7/00* | (2006.01) | |
| *B29B 9/04* | (2006.01) | |
| *B29B 13/02* | (2006.01) | |
| *B29B 13/04* | (2006.01) | |
| *C02F 3/10* | (2006.01) | |
| *C02F 103/00* | (2006.01) | |
| *C02F 103/34* | (2006.01) | |

(52) U.S. Cl.
CPC ............. *B29C 48/08* (2019.02); *B29B 7/007* (2013.01); *B29B 9/04* (2013.01); *B29B 13/02* (2013.01); *B29B 13/04* (2013.01); *B29C 48/0022* (2019.02); *B29C 48/022* (2019.02); *B29C 48/92* (2019.02); *C02F 3/106* (2013.01); *B29C 2948/92209* (2019.02); *B29C 2948/92704* (2019.02); *C02F 2103/005* (2013.01); *C02F 2103/34* (2013.01)

(58) Field of Classification Search
CPC ............. B29C 48/08; B29C 48/0022; B29C 2948/92704; B29C 2948/92209; B29B 7/007; B29B 9/04
See application file for complete search history.

(56) References Cited

U.S. PATENT DOCUMENTS

| | | | | |
|---|---|---|---|---|
| 2013/0062576 A1* | 3/2013 | Jha | ........................... | C08L 77/06 524/505 |
| 2013/0313172 A1* | 11/2013 | Zhang | ....................... | C02F 3/28 210/150 |
| 2014/0061125 A1* | 3/2014 | Quan | ..................... | C02F 3/2826 210/605 |
| 2019/0144316 A1* | 5/2019 | Quan | ..................... | C02F 3/107 210/150 |

FOREIGN PATENT DOCUMENTS

| | | | |
|---|---|---|---|
| CN | 103420490 A | 12/2013 | |
| CN | 103797072 A | 5/2014 | |
| CN | 103818998 A | 5/2014 | |
| CN | 104448468 A | 3/2015 | |
| CN | 107953569 A | 4/2018 | |
| EP | 3695955 A4 * | 10/2020 | ............. B29B 13/02 |
| JP | 2001197885 A | 7/2001 | |
| KR | 2014-0098012 A | 8/2014 | |

OTHER PUBLICATIONS

Chinese Office Action in application No. 201711144681.9 dated May 31, 2019, with English translation; pp. 1-12.
Chinese Office Action in application No. 201711144681.9 dated Dec. 30, 2019, with English translation; pp. 1-13.

\* cited by examiner

*Primary Examiner* — Seyed Masoud Malekzadeh
(74) *Attorney, Agent, or Firm* — Muncy, Geissler, Olds & Lowe, P.C.

(57) ABSTRACT

The invention, belonging to the field of biological treatment of pollutants and functional materials, presents a method for the preparation of biofilm carrier with biochar fixed by thermoplastic resin. Extrusion grade polyethylene/polypropylene particles are used as the basic material. One or some combination of plant biochar, straw biochar, rice husk biochar, shell biochar, excess sludge and animal waste biochar are used as the functional material. The biofilm carrier with biochar fixed by thermoplastic resin is prepared by the screw extrusion process, which is a simple, flexible and controllable method, and possesses strong adaptability. The reactor with these biofilm carriers has high removal efficiency of refractory organic pollutants.

3 Claims, No Drawings

METHOD FOR THE PREPARATION OF BIOFILM CARRIER WITH BIOCHAR FIXED BY THERMOPLASTIC RESIN

TECHNICAL FIELDS

The present invention related to a method for the preparation of biofilm carrier with biochar fixed by thermoplastic resin, is applied to the biological treatment of environmental pollutants, and is particularly suitable for the biological wastewater treatment, and belongs to the field of biological treatment of pollutants and functional materials.

BACKGROUND

Domestic sewage and industrial wastewater are the main pollution sources of water in China. Compared with domestic sewage, the discharge of industrial wastewater and the types of pollutants in the wastewater are increasing, and the components are more complex, including a variety of refractory organic pollutants. Refractory organic pollutants are those that can hardly be degraded by microorganisms, or require a very long time for degradation. They are easily accumulated in natural media such as water bodies and soils. The refractory organic wastewater involve a wide range of industries, mainly chemical, light industry, printing and dyeing, pharmaceutical, pesticide and coal chemical wastewater. These wastewater mainly contain refractory organic components such as phenols, halogenated compounds, monocyclic aromatic compounds, polycyclic aromatic hydrocarbons, polychlorinated biphenyls, pesticides, herbicides and dyes, and their harm to the environment has been widely recognized in the world. The control of refractory organic pollutants is an important issue in the field of water pollution prevention and control. Recent studies have shown that the addition of artificial redox mediators can accelerate the extracellular electron transfer rate of microorganisms, thereby enhancing the biodegradability of refractory organic pollutants and shortening the degradation time. Therefore, the redox mediators have been paid more and more attention because of its good application potential.

The redox mediator can transfer electrons through its own redox capacity, which mainly involved in microbial extracellular electron transfer process to accelerate the electron transport rate. Hence the degradation rate of pollutants could be significantly improved. At present, the commonly used redox mediators mainly include some quinone, phenazine, phthalocyanine and so on. These compounds have $\pi$-$\pi$ conjugated systems and have active sites for the gain/loss of electrons, such as carbonyl (C=O). However, these compounds are soluble, and it is necessary to add these compounds from time to time during the biological water treatment process, which will result in an increase of operation cost, and secondary pollution also. Carbonaceous materials such as graphene, carbon nanotubes, biochar, etc., are redox mediators with high reusability that have been studied in recent years. Biochar, also known as black carbon, is a kind of insoluble, stable, highly aromatic, carbon-rich solid residue produced by high temperature pyrolysis (carbonization) of biomass under low or no oxygen (usually <700° C.). The raw material cost of biochar preparation is low, the source is plentiful, such as the wood, the fruit shell, the straw, the sludge, the animal excrement and so on. Related research results show that the surface of the biochar is rich in oxygen containing functional groups (such as carbonyl, hydroxyl, etc.). In the process of bioremediation of pollutants, biochar can receive electrons which derived from the biodegradation of pollutants. After that, the reduced biochar can transfer the electrons to receptors. During the whole biodegradation process, biochar acted as redox mediators and can improve the biodegradation efficiency. However, if the biochar is directly used as the redox mediator, the problem of loss will also exist, so there will also be problems such as increasing investment cost and causing secondary pollution to the environment. Based on this, the purpose of the present invention is to fix the biochar functional materials on the thermoplastic resin and develop a new biological carrier for fixing the biochar functional materials with the thermoplastic resin.

SUMMARY

The present invention is directed to the problem of slow treatment rate of refractory organic matter in water due to the limitation of electron transfer rate in biological water treatment technology. The present invention aims to provide a method the preparation of biofilm carrier with biochar fixed by thermoplastic resin.

Technical Solution of the Present Invention

A method for the preparation of biofilm carrier with biochar fixed by thermoplastic resin, comprising the following steps:
(1) Biochar functional materials is ground to powder, and dried to constant weight under≤80° C.;
(2) Biochar functional materials powder, which is pretreated according to step (1), is blended into thermoplastic resin particles, and stirred evenly. The mass percentage of biochar powder to thermoplastic resin particles is 20%/50%;
(3) The solid mixture obtained from step (2) is melt extruded into strips by a screw extruder, and mechanically cut to obtain a granular blend. The processing temperature of each section of the screw extruder is 130-190° C. to ensure that the thermoplastic resin is fully mixed with biochar functional materials powder in the molten state.
(4) The granular blend prepared in step (3) and the thermoplastic resin particles are mechanically stirred evenly, and then are added to the screw extruder for co-mixing and extrusion. Then the carrier pipes of different shapes are obtained according to the design of mould. The ratio of biochar mass to the total mass of thermoplastic resin particles in granular blends is less than 20%.
(5) The carrier pipes prepared in step (4) are cut mechanically and the biological carriers are obtained according to the required size.

The biochar functional materials mentioned are one or more combinations of grass biochar, straw biochar, rice husk biochar, nut shell biochar, sludge biomass biochar and animal excrement biochar.

The thermoplastic resin particles are extruded grade polyethylene particles or extruded grade polypropylene particles.

The screw extruder is heated in four sections, and the temperature range and effects of each section heating are as follows:
(1) The temperature is 120-140° C., and the thermoplastic resin reaches the semi-molten state, which is conducive to the continuity of solid transport.
(2) The temperature is 130-160° C., which accelerates the transformation of the thermoplastic resin from the semi-molten state to the molten state, and is conducive to the homogeneous mixing of the blends in the heating section.
(3) The temperature is 140-170° C., which can make the blend in a solid-liquid mixing state, so that the melting thermoplastic resin and solid biochar functional materials are fully mixed, which is conducive to the uniform distribution of biochar functional materials and thermoplastic resin in the molten state.

(4) The temperature is 115-145° C. to ensure the quantitative and constant pressure outflow of the blends, and to ensure the stability and continuity of extrusion and the subsequent smooth shaping.

Advantages of the Invention

The preparation method of the biofilm carriers for fixing biochar by thermoplastic resin is described in the invention, which is a simple, flexible and controllable method, and possesses strong adaptability, and it can be produced on a large scale. The biofilm carriers have an efficient removal efficiency of refractory organic pollutants.

DETAIL DESCRIPTION

The specific implementation of the present invention will be described in detail below in conjunction with the technical solution.

Example 1

The preparation of the biofilm carrier with straw biochar fixed by thermoplastic resin: (1) The straw biochar is ground to powder, and dried into constant weight at 60° C.; (2) Biochar powder, which is pretreated according to step (1), is blended into thermoplastic resin particles, and stirred evenly; (3) The solid mixture obtained from step (2) is melt extruded into strips by a screw extruder. The processing temperature of each section of the screw extruder is 175° C. The mass percentage of straw biochar powder to thermoplastic resin particles is 30%; (4) The granular blend prepared in step (3) and the thermoplastic resin particles are mechanically stirred evenly, and then added to the screw extruder for co-mixing and extrusion, the carrier pipes of different shapes are obtained, according to the design of mould. The ratio of biochar functional materials mass to the total mass of thermoplastic resin particles in granular blends is less than 4%; (5) The carrier pipes prepared in step (4) are cut mechanically and the biological carriers are obtained according to the required size.

The biofilm carriers are applied to the aerobic biodegradation experiment of phenol wastewater (the dissolved oxygen was controlled at 2.0-3.0 mg/L), and its effect on the biodegradation performance of microorganisms in water is investigated. In the experiment, the dosage of carriers is 30% of the effective volume of the reactor, and the hydraulic retention time is 8 hours. The experimental results show that: (1) in the absence of microorganisms, the carrier adsorption experiment of phenol in water is carried out, and the results show that the removal rate of phenol through the carrier adsorption is less than 3%. (2) in the presence of microorganisms, compared with the high-density polyethylene carrier without fixed biochar, the removal of phenol in the reactor fixed with high-density polyethylene (HDPE) is nearly 10% higher than that of the high-density polyethylene carrier without fixed biochar.

Example 2

The preparation of the biofilm carrier with straw biochar fixed by thermoplastic resin: (1) The rice husk biochar is ground to powder, and dried into constant weight at 60° C.;

(2) Biochar powder, which is pretreated according to step 1, is blended into thermoplastic resin particles, and stirred evenly; (3) The solid mixture obtained from step (2) is melt extruded by a screw extruder. The processing temperature of each section of the screw extruder is 185° C. to ensure that the basic material is fully mixed with biochar functional materials in the molten state, and can be shaped into particles, the mass percentage of rice husk biochar to thermoplastic resin is 50%. (4) The granular blend prepared in step (3) and the thermoplastic resin particles are mechanically stirred evenly, and then added to the screw extruder for co-mixing and extrusion, the carrier pipes of different shapes are obtained, according to the design of mould. The ratio of biochar functional materials mass to the total mass of thermoplastic resin particles in granular blends is less than 8%(5) The carrier pipes prepared in step (4) are cut mechanically and the biological carriers are obtained according to the required size.

The preparation methods of carbonylation modified graphene oxide (GO) as the biofilm carrier of functional materials are as follows: (1) preparation of carbonylation modified GO functional materials: the pH is adjusted to 10 with ammonia. The dispersion hydrothermally reacts at 90° C. for 6 hours, and then is cooled down and dried at 60° C. The solid particles obtained are referred as N-GO. The 0.2 g solid particles N-GO are added to the water (20 mL), and uniformly dispersed by ultrasonication, and then 1.2 g potassium dichromate is added into the dispersion under the condition of the addition of acid ($H_2SO_4$ 5 mL) and ice water bath. After being fully stirred for 3 hours and dried, the solid particles are obtained. They are carbonylation modified graphene oxide, and called as Q-GO. (2) the non-dissolved redox mediator material is ultrasonically dispersed in the water, and mixed with the basic material added with the mass ratio of the mediator material to the basic material being 1:100, and then soaked for 2 hours, stirred every half an hour to make the redox mediator fully contact with the basic material in the water, and the resulting solid mixture is dried at 80° C. The biofilm carriers are prepared by extrusion, cooling, traction, incision and shaping.

The modified (modified by biochar, carbonylation modification of graphene oxide, respectively) and unmodified (HDPE) carriers are used to treat phenol wastewater in the condition of aerobic or anaerobic. The effects of different carriers on the biodegradation performance of microorganisms in water with different phenol concentrations in the influent are investigated. In the experiment, the dosage of carriers is 30% of the effective volume of the reactor.

The experimental results are shown in table 1. It can be seen from the table that under the conditions of aerobic and anaerobic with different phenol concentrations in the influent, the biodegradation performance of phenol in the reactor with modified carrier is better than that of the reactor with unmodified carrier. However, among the reactors with modified carriers, the biochar modified carriers have slightly better biodegradation performance than the reactors with modified carriers modified by carbonylation modification of graphene oxide. In addition, compared with the preparation method of carbonylation modified graphene oxide as functional material, the preparation method of bio-carrier fixed by thermoplastic resin is simpler, easier to operate, more time-saving and conducive to ensuring the continuity of the production process. Furthermore, compared with carbonylation modified graphene oxide as the functional materials, the biochar as the functional materials are more widely sourced, cheaper and more conducive to the realization of large-scale production and application.

TABLE 1

Effect of modified carriers on biodegradability of phenol

| | Phenol conc. (mg/L) | Removal efficiency (%) | | |
|---|---|---|---|---|
| | | PE | Q-GO | Biochar |
| Aerobic | 200 | 94.2 | 98.9 | 99.3 |
| HRT 8 h | 400 | 93.9 | 98.8 | 99.0 |
| DO 2.0-3.0 | 600 | 92.9 | 98.6 | 98.7 |
| mg/L | 800 | 89.7 | 98 | 98.7 |
| Anaerobic | 200 | 89.3 | 93.5 | 96.7 |
| HRT 12 h | 400 | 66.4 | 90.1 | 93.6 |
| DO <0.1 | 600 | 66.1 | 89 | 91.1 |
| mg/L | 800 | 65.4 | 87.8 | 89.3 |

Note:
PE represents the reactor with unmodified biological carriers, Q-GO represents the reactor with the biological carriers modified by carbonylation modified graphene oxide, and Biochar represents the reactor with the biological carriers modified by biochar functional materials.

We claim:

1. A method for the preparation of biofilm carrier with biochar fixed by thermoplastic resin, comprising:
   (1) biochar functional material is ground to powder and dried to a constant weight at ≤80° C.; surface of the biochar functional material comprises oxygen-containing functional groups having a function of redox mediator;
   (2) biochar functional material powder, which is pretreated according to step (1), is blended into thermoplastic resin particles and stirred evenly; a mass percentage of the biochar functional material powder to the thermoplastic resin particles is 20%-50%;
   (3) a solid mixture obtained from step (2) is melt extruded into strips by a screw extruder and mechanically cut to obtain a granular blend; a processing temperature of each section of the screw extruder is 130-190° C. to ensure that the thermoplastic resin particles are fully mixed with the biochar functional material powder in a molten state;
   (4) a granular blend prepared in step (3) and the thermoplastic resin particles are mechanically stirred evenly, and then added to the screw extruder for co-mixing and extrusion, carrier pipes of different shapes are obtained, according to a design of a mould; a ratio of a mass of the biochar functional material powder to a total mass of the thermoplastic resin particles in granular blends is less than 20%;
   (5) the carrier pipes prepared in step (4) are cut mechanically and biological carriers are obtained according to a required size, the biological carriers are used in a biological treatment of sewage,
   wherein the biochar functional material is grass biochar, straw biochar, rice husk biochar, nut shell biochar, sludge biomass biochar, animal excrement biochar, or a combination thereof,
   wherein the thermoplastic resin particles are extruded grade polyethylene particles or extruded grade polypropylene particles.

2. The method for the preparation of biofilm carrier according to claim 1, wherein the screw extruder is heated in four sections, and a temperature range and effects of each section heating are as follows:
   (1) the temperature is 120-140° C., and the thermoplastic resin reaches a semi-molten state, which is conducive to a continuity of solid transport;
   (2) the temperature is 130-160° C., which accelerates a transformation of the thermoplastic resin from the semi-molten state to the molten state, and is conducive to a homogeneous mixing of blends in a heating section;
   (3) the temperature is 140-170° C., which makes the blends in a solid-liquid mixing state, so that the thermoplastic resin in the molten state and the biochar functional material are fully mixed, which is conducive to a uniform distribution of the biochar functional material and the thermoplastic resin in the molten state;
   (4) the temperature is 115-145° C. to ensure a quantitative and constant pressure outflow of the blends, and to ensure stability and continuity of extrusion and subsequent smooth shaping.

3. The method for the preparation of biofilm carrier according to claim 1, wherein the screw extruder is heated in four sections, and a temperature range and effects of each section heating are as follows:
   (1) the temperature is 120-140° C., and the thermoplastic resin reaches a semi-molten state, which is conducive to a continuity of solid transport;
   (2) the temperature is 130-160° C., which accelerates a transformation of the thermoplastic resin from the semi-molten state to the molten state, and is conducive to a homogeneous mixing of blends in a heating section;
   (3) the temperature is 140-170° C., which makes the blends in a solid-liquid mixing state, so that the thermoplastic resin in the molten state and the biochar functional material are fully mixed, which is conducive to a uniform distribution of the biochar functional material and the thermoplastic resin in the molten state;
   (4) the temperature is 115-145° C. to ensure a quantitative and constant pressure outflow of the blends, and to ensure stability and continuity of extrusion and subsequent smooth shaping.

* * * * *